(12) United States Patent
Berthiaud et al.

(10) Patent No.: US 10,990,973 B2
(45) Date of Patent: Apr. 27, 2021

(54) DEVICE FOR ENTRY ON A TOUCH-SENSITIVE SURFACE AND CORRESPONDING METHOD

(71) Applicant: Ingenico Group, Paris (FR)

(72) Inventors: Olivier Berthiaud, Cornas (FR); Andre Carabelli, Saint-Peray (FR); Stephane Pavageau, La Roche de Glun (FR)

(73) Assignee: INGENICO GROUP, Paris (FR)

( * ) Notice: Subject to any disclaimer, the term of this patent is extended or adjusted under 35 U.S.C. 154(b) by 254 days.

(21) Appl. No.: 16/118,066

(22) Filed: Aug. 30, 2018

(65) Prior Publication Data

US 2019/0066108 A1 Feb. 28, 2019

(30) Foreign Application Priority Data

Aug. 31, 2017 (FR) ...................................... 1758053

(51) Int. Cl.

| | |
|---|---|
| *G06F 3/041* | (2006.01) |
| *G06Q 20/40* | (2012.01) |
| *G06F 21/31* | (2013.01) |
| *G06F 3/0354* | (2013.01) |
| *G06F 21/83* | (2013.01) |
| *G09B 21/00* | (2006.01) |
| *G06F 3/0488* | (2013.01) |

(52) U.S. Cl.
CPC ..... *G06Q 20/4012* (2013.01); *G06F 3/03547* (2013.01); *G06F 3/0412* (2013.01); *G06F 3/04886* (2013.01); *G06F 21/31* (2013.01); *G06F 21/83* (2013.01); *G09B 21/003* (2013.01)

(58) Field of Classification Search
CPC ............... G06F 3/04886; G06F 3/0354; G06F 3/03547; G06F 3/041
See application file for complete search history.

(56) References Cited

U.S. PATENT DOCUMENTS

| | | | |
|---|---|---|---|
| 7,057,579 B2 * | 6/2006 | Hanson | G06F 1/1601 345/2.1 |
| 7,315,260 B1 * | 1/2008 | Lam | G06F 1/1626 340/12.51 |
| 10,042,480 B2 * | 8/2018 | Krahenbuhl | G06F 1/1671 |
| 2011/0227871 A1 | 9/2011 | Cannon | |

(Continued)

FOREIGN PATENT DOCUMENTS

| | | |
|---|---|---|
| DE | 102012100717 A1 | 8/2013 |
| GB | 2516345 A | 1/2015 |

OTHER PUBLICATIONS

French Search Report dated Apr. 23, 2018 for corresponding French Application No. 1758053, filed Aug. 31, 2018.

(Continued)

*Primary Examiner* — Vijay Shankar
(74) *Attorney, Agent, or Firm* — David D. Brush; Westman, Champlin & Koehler, P.A.

(57) ABSTRACT

A device for entering data, which is configured to be laid down on a touchpad of a terminal. The device for entering data includes an appreciably parallelepiped-shaped plate. The plate includes an upper face, at least one part of which includes a keypad-forming matrix of entry zones, and a lower face. The lower face includes, for each key of the keypad on the upper face, at least one contact zone electrically connected to a corresponding key on the upper face.

8 Claims, 2 Drawing Sheets

(56) References Cited

U.S. PATENT DOCUMENTS

2011/0248947 A1 10/2011 Krahenbuhl et al.
2013/0302777 A1 11/2013 Tomkins et al.
2015/0205370 A1 7/2015 Morris

OTHER PUBLICATIONS

French Written Opinion dated Apr. 23, 2018 for corresponding French Application No. 1758053, filed Aug. 31, 2018.
French Search Report dated Apr. 23, 2018 for corresponding French Application No. 1758053, filed Aug. 31, 2017.
French Written Opinion dated Apr. 23, 2018 for corresponding French Application No. 1758053, filed Aug. 31, 2017.
English translation of French Search Report and Written Opinion dated Apr. 23, 2018 for corresponding French Application No. 1758053, filed Aug. 31, 2017.

* cited by examiner

DEVICE FOR ENTRY ON A TOUCH-SENSITIVE SURFACE AND CORRESPONDING METHOD

1. CROSS-REFERENCE TO RELATED APPLICATION

This Application claims priority to and the benefit of French Patent Application No. 1758053, filed Aug. 31, 2017, the content of which is incorporated herein by reference in its entirety.

2. FIELD OF THE INVENTION

The present technique relates to the field of data entry devices. More specifically, the present invention relates to an entry device that is to be laid down on a touchpad. The present technique can be applied especially to the entry of confidential codes or personal identification codes on a touch-sensitive surface, for example for visually impaired persons.

3. PRIOR ART

Touch-sensitive screens are widely used to enter data into computerized data-processing systems. For example, mobile telephones, computers, tablets or again payment terminals and automatic teller machines (ATMs) or cash dispensers have touch-sensitive screens to facilitate the entry of data by users.

To make an entry, a user can touch one or more characters on a virtual keypad displayed on the touch-sensitive screen by using a finger or a stylus. It is thus no longer necessary to have a physical keypad to enter text. However, the entry of text using a virtual keypad has drawbacks, especially for visually impaired persons, but also for technophobic individuals or those unaccustomed to digital practices. In particular, unlike physical keypads, virtual keypads are displayed on a flat screen and do not allow certain users to locate their position spatially on the virtual keys.

This drawback is especially inconvenient for payment terminals or automatic teller machines (ATMs) that have a touch-sensitive screen. Indeed, when a user uses his bankcard to make a payment or to withdraw cash, he must use his PIN code for authentication. It is not possible for a visually impaired person to enter his PIN code on a virtual keypad displayed on a touch-sensitive screen.

A European directive currently being drafted obliges merchants and bankers to provide a solution for visually impaired persons. The prior-art solution consists in providing, as before, an electronic physical keypad connected to a payment terminal, even if a virtual keypad is available on the touch-sensitive screen. The cost of manufacturing payment terminals or automatic teller machines (ATMs) is thus increased without obtaining a solution that is truly worthwhile, especially from the technical and aesthetic viewpoints. Indeed, the physical keypad intended for visually impaired persons has to be secured to prevent hacking, thus increasing cost, and this keypad is generally not aesthetically integrated into the touch-sensitive approach.

Besides, in addition to problems of aesthetics or cost, there is also a major problem of security. Indeed, unlike a standard user, vulnerable individuals such as the visually impaired persons must often seek the help of other people whom they do not necessarily know. This is a source of great stress for these persons. When for example they have to type out a PIN code and therefore reveal sensitive information, they need to make sure that the person from whom they seek help will not try and keep this information for fraudulent use.

In the same way, many users are not capable of detecting and efficiently combating the snooper applications and software installed in their communications terminals. Now, increasingly, communications terminals are used to enter confidential information and especially payment information (PIN codes, bank accounts details etc.). To counter these problems of fraud, existing solutions propose a random display of the virtual keyboard. In such a random display, the keypad keys are disposed randomly and the user must identify the keys in order to be able to enter his confidential data (for example the PIN code). A secured application installed on the communications terminal sees to the setting up of correspondence between the user's entry zones and the corresponding characters. It is clear that there are many users for whom this procedure is not suitable. This is the case especially for visually impaired individuals or more generally for people unable to cope with the digitalization of these operations of entry on touch-sensitive screens.

There is thus a need for a solution enabling visually impaired persons to enter confidential data on devices (payment terminal, communications terminal, for example) having a touch-sensitive screen that ensures the security of the data entered while reducing the cost of this solution and preserving the aesthetic features related to the use of touch-sensitive screens.

4. SUMMARY

An exemplary embodiment of the present disclosure at least partially resolves the problems of the prior art. An exemplary embodiment makes it possible especially for any type of user to make an entry of data on a touch-sensitive screen and to do so in a simple, ergonomical and secured manner. More particularly, an exemplary embodiment of the invention relates to a device for entering data that is to be laid down on a touchpad of a terminal. According to an exemplary embodiment of the invention, such an entry device comprises a generally parallelepiped-shaped plate, said plate comprising an upper face, at least one part of which comprises a keypad-forming matrix of entry zones and a lower face, said lower face comprising, for each key of said keypad on the upper face, at least one contact zone electrically connected to a corresponding key on the upper face.

According to one particular embodiment, the entry device comprises means such that a pressure by a keypad key prompts a production of a geometric pattern corresponding to this key on said touchpad.

Thus, the terminal on which the device is laid down is capable of detecting pressure on a key of the keypad plotted or reproduced on the upper face. It is therefore possible to associate, with a key on the upper face, one or more contact zones on the lower face to produce a unique geometrical pattern. Thus, the device can be positioned freely on the touch-sensitive surface of the terminal because it is made sure that, whatever the position and orientation selected, each key will have an associated unique geometrical pattern and will therefore be capable of being recognized by the terminal. Thus, the security of the entry of the codes, for example the entry of confidential codes, especially by visually impaired persons, is greatly increased.

According to one particular embodiment, the device furthermore comprises at least one electrically charged contact zone, called a detection zone, connected to a conductive element that is at least partially situated on the rim of the upper face of said device.

Thus, in addition to detecting instances of pressure on keys made on the upper face, it is possible to detect the laying down of the device on the touch-sensitive screen. When it detects the laying down of the entry device on the touch-sensitive screen, the terminal can then implement a particular procedure, described here below, making it possible to detect the orientation and the position of the entry device.

According to one particular characteristic, the device comprises three detection zones distributed on the rim of the lower face of said device so as to form a non-isosceles triangle, called a detection triangle.

Thus, by means of these three detection zones, the terminal which knows the geometry of this triangle is capable of detecting the position and orientation of the device automatically or semi-automatically.

According to one particular characteristic, each key of said keypad on the upper face comprises an electrically charged contact zone forming, with the detection triangle, a unique form specifically associated with said key.

According to one particular embodiment, each key of said keypad on the upper face comprises three electrically charged contact zones forming, on the inner face, a unique shape specifically associated with said key.

Thus, each key of the keypad intrinsically comprises a signature. This signature is constituted at least by the three points of contact with the touchpad of the terminal. When the entry device is laid down on a touch-sensitive surface, and more particularly on a capacitive touch-sensitive surface, the layer of the touch-sensitive surface that collects the charges transmits certain of these charges to the three contact points. The terminal is then capable of detecting that these contact points correspond to a particular geometry representing the associated key. The terminal can then associate this geometry with a given key: For example a certain triangle or a certain quadrilateral is associated with the key 1 while another triangle or quadrilateral is associated with the key 2 and so on According to one particular embodiment, the device is constituted by transparent plastic.

Thus, the entry device is a secured device: indeed, because of the transparency of the device, it is not possible to attach fraudulent, entry monitoring mechanisms to it. Indeed, if such mechanisms were to be attached, they would be immediately detected because of the transparency of the device for entering data.

According to one particular embodiment, the generally parallelepiped-shaped plate has a thickness ranging from one to three millimeters. Within this plate, zones of lesser thickness are made at the position of the keys.

According to one particular characteristic, an electrical link between a key of the upper surface and a contact zone of the lower surface is provided by means of a conductive ink.

According to one particular embodiment, the keypad-forming set of keys is represented by a keypad for entering a confidential code on a payment terminal.

According to another aspect, an exemplary embodiment of the invention also relates to a method for entering data on a touchpad of a terminal. Such a method of entry comprises:
    a step for the laying down, on a touch-sensitive screen of said terminal, of a device for entering data as described here above;
    an optional step for the detection, by the terminal, of the laying down of said device for entering data; and
    a step for the entry, by a user, of data on the surface of said device for entering data.

According to one particular characteristic, the data entry method comprises, subsequently to the step of detection, a step for switching over into a mode of entry suited to said device for entering data.

An exemplary embodiment of the invention also relates to a system for entering data comprising a terminal provided with a touch-sensitive screen and a device for entering data as described here above.

5. FIGURES

Other features and advantages shall appear more clearly from the following description of one particular embodiment of the disclosure given by way of a simple illustratory and non-exhaustive example and from the appended figures, of which:

6. DETAILED DESCRIPTION

6.1. General Principle

Figure 1:
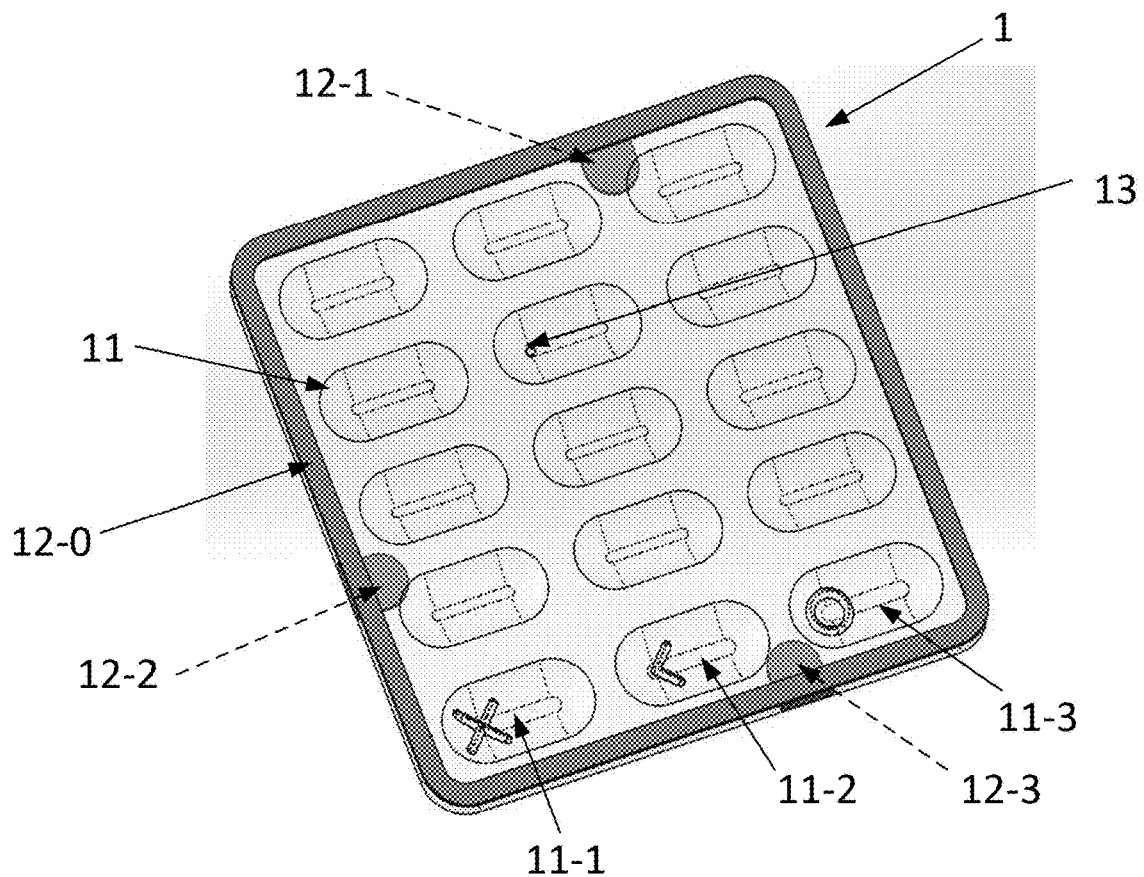
FIG. 1 illustrates a device for entering data according to a first embodiment of the invention.

The proposed technique relates a physical device for entering data that is to be laid down at a random position on a touch-sensitive screen of a terminal. The orientation of the device can also be random on the touch-sensitive screen. A user can use the entry device to enter characters on the touch-sensitive pad screen of a terminal. The entry device according to the proposed technique comprises a plate comprising an upper surface and a lower surface. The upper surface of the device for entering data comprises a keypad-forming matrix of entry zones, comprising a set of keys. The pad can be made out of plastic, silicone or other materials that enable compliance with prevailing standards for keypads, especially keypads for visually impaired persons, comprising for example a relief or an embossed marking of the keys. Depending on the embodiments, the matrix can be transparent in one zone or in its totality or it can be open-worked to enable the display of information from the screen and enable a detection of unauthorized snooper devices if any.

An exemplary embodiment of the invention relates, so to speak, to an interfacing device for interfacing between a touchpad, enabling the entry of data, and a user, the user being capable of locating, on the interfacing device, keys corresponding to characters to be entered.

According to an exemplary embodiment of the invention, conductive materials are also incorporated to enable the smart indexing of this matrix as explained here below.

The dimensions and the layout of the keys of the matrix of entry zones can be preliminarily known to visually impaired persons so that they can locate their position on the matrix of entry zones. The matrix of entry zones can also comprise embossed patterns or hollow patterns so that visually impaired persons can locate their position even without prior knowledge of the dimensions and layout of the entry matrix.

According to the general principle of the proposed technique, at least one electrically charged (or conductive) contact zone is disposed on the lower face of the plate. A contact zone can consist of metal part or a pattern made with the conductive ink or other means. The (secured or non-secured) entry application for the terminal can thus make an association between the keys of the matrix of entry zones of the device for entering data and the corresponding characters. This is an association made by means of the position and/or geometrical characteristics of the electrically charged contact zone or zones (or conductive contact zones).

According to a first embodiment of the proposed technique, described more specifically here below, at least one of the (electrically charged or conductive) contact zones enables the terminal to detect the position of the device for entering data when it is laid down on the touch-sensitive screen. The terminal can preliminarily record (or know) the position of the matrix of entry zones relative to the position of the electrically charged zone or zones and the dimensions and layouts of the keys of the matrix of entry zones (for example by an entry application specific to the device of an exemplary embodiment of the invention). The touch-sensitive screen can detect the contact of a finger or a stylus on an entry key of the matrix of entry zones. The character corresponding to the entry key can be identified by the terminal according to the position of the electrically charged contact zone.

According to a second embodiment of the proposed technique, the (electrically charged or conductive) contact zones define different patterns for each key of the entry device. As soon as a key of the matrix of data entry zones is pressed, a unique geometrical shape (or pattern) (a triangle for example) is actuated on the lower face of the device for entering data. Thus, the position of the device for entering data is no longer important because each unique pattern has a corresponding specific character. The terminal can identify the character entered from the pattern actuated on the screen of the terminal: since each geometrical pattern is unique, the application of the terminal is capable of associating each unique geometrical shape with a specific character. This solution has the advantage of presenting the user only with plastic surfaces and of having contact zones (electrically charged or conductive zones) on a concealed face. In addition, the device shows little sensitivity to wear. The device is independent and requires no batteries or electronic components. It acts as a physical interface (tactile overlayer) between the touch-sensitive screen of the terminal and the user's finger.

6.2. First Embodiment of the Invention

6.2.1. Device for Entering Data

Referring to FIG. 1, we describe a first embodiment of the device for entering data according to the invention. As illustrated in FIG. 1, the device for entering data comprises a plate 1 that is to be laid down on the touchpad of a payment terminal. The plate 1 which is generally rectangular is constituted by a transparent plastic and comprises a structured upper face and a generally flat lower face (that is to be placed on a touchpad). The upper surface comprises a keypad-forming matrix of entry zones. The matrix of entry zones comprises a rectangular set of entry keys 11 comprising numeric keys and three function keys 11-1, 11-2 and 11-3. The keys are in the shape of hollows formed on the upper face of the plate. This makes it possible firstly to situate the finger and secondly to approach the touchpad. There is a position-locating point 13 on a key at the center of the matrix to make it easier to locate the position of the keypad.

The lower face of the plate 1 comprises three contact zones (which are conductive in the present case) 12-1, 12-2 and 12-3 in the form of three metal washers or disks. The three metal washers are connected by a metal ring 12-0 encircling the plate 1. The position (and orientation and size) of the entry device can be determined when placing the plate on the screen, when the user touches the metal ring 12-0: an electrical contact then occurs between the user's finger and the metal ring 12-0 and continues up to the three contact zones (which form the detection triangle). Several configurations and hence several types of detection triangles can be implemented. The detection triangle however is not an isosceles triangle, precisely in order to enable a detection of the position and orientation of the device.

According to an alternative solution, the three contact zones can be made by means of conductive ink on the lower face and connected by via holes to the upper face which will also be conductive (for example by means of a transparent ink (ITO or graphene) or through a fine pattern or a grid pattern of ink, as in the case of the touchpads themselves)). Thus, as soon as the user applies pressure to the keypad, he activates not only the key in question but also the three contact zones enabling the orientation and position of the keypad to be detected.

Whatever the solution chosen, when it is planned to dispose of several types of different matrices, in terms of size and function as well as in the number of keys, the use of the peripheral contact zones makes it possible to comply with these different configurations of the device, for example by having configuration data available within the application of the terminal.

Thus, in this type of embodiment, the lower face of the plate comprises for example three contact zones: the zones are positioned on the rim of the device so as to form a unique triangle, known to the entry application installed in the terminal. This triangle enables this application to determine the position and orientation of the device for entering data and to do so whatever the characteristics of size of the device, thus making it possible to have devices of different sizes, for example depending on the needs of entry or on characteristics related to the users.

The communications terminal comprises a specific application or a module that enables the identification of this triangle and therefore makes it possible to know the position and orientation of the entry device relative to the screen (and possibly its type). In this way, when the user enters information (for example a PIN code) through the entry device, the terminal is capable of recognizing the characters entered (whatever the position and orientation of the device), without even needing to display the virtual keypad on the screen. In this first embodiment, the entry device of the invention therefore increases the level of security of the entry of a piece of information on a touch-sensitive screen, for all users (and not for visually impaired persons alone).

As an alternative, in one variant, the communications terminal does not recognize the position and/or orientation of the device. However, each entry produces a particular geometrical pattern on the touchpad of the terminal. This particular geometrical pattern is determined on the one hand by means of contact zones laid out on the rim of the lower face (two, three or more contact zones) and on the other hand by the key that has been entered (i.e. the place on the keypad where the user has put his finger). When two contact zones are present on the rim of the lower face, each entry produces a unique triangle on the touchpad: the entry application can associate this triangle with a character, a digit or a given function. When three contact zones are present on the rim of the lower face, each entry produces a unique quadrilateral on the touchpad: the entry application can associate this quadrilateral with a character, a digit or a given function. Naturally, it is possible to greatly increase the contact zones and it is also possible to envisage the use of one contact zone (on the rim of the upper face) to detect the character entered. In this case, the geometrical shape detected is a straight-line segment having predetermined orientation and length.

6.2.2. Method of Data Entry

Here below, we describe a method for entering data on a touchpad of a terminal by using the device for entering data for visually impaired persons according to the first embodiment of the invention. The method comprises:
- a step for laying down a device for entering data for visually impaired persons on a touch-sensitive screen of the terminal;
- the device can be laid down on a random zone of the touch-sensitive screen.
- an optional step of detection, by the terminal, of the laying down of the device for entering data; this optional step being capable of prompting the passage into "blind" mode with latency and/or without the display of the keypad on the screen and/or with haptic (vibrator or pulse) feedback;
- the optional step of detection can comprise a step for detecting the positions of the contact zones of the entry device; depending on the positions detected, the terminal can determine the positions of keys in the matrix of the entry zones; as an alternative, when the user touches a key of the device for entering data, the terminal can determine the character or action corresponding to the key by the detection of a geometrical (triangle, quadrilateral etc.);
- a step for the entry, by a user, of data into the surface of the device for entering data.

The step which consists in passing into "blind" mode is implemented by the communications terminal, by means of the application and/or entry module. The passage into 'blind' mode, common to all embodiments, makes it possible especially not to display the virtual keypad on the screen of the terminal (and therefore increases security); while ensuring that the entries made are correct: haptic feedback can be used to report the entry and latency can be implemented between the entries of two characters in order to avoid errors, and so on.

6.3. Second Embodiment

6.3.1. Device for Entering Data

Figure 2:
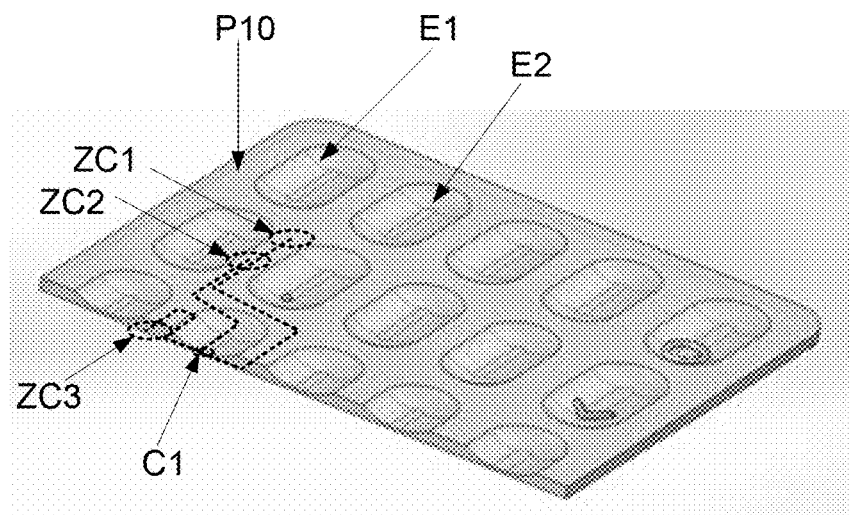
FIG. 2 illustrates a device for entering data according to a second embodiment of the invention.

In a second embodiment, described with reference to FIGS. 2 and 3, the device for entering data according to the invention does not include contact zones on the rim of the lower face. The device therefore takes the form of a transparent plate P10 (for example manufactured by molding or injection), comprising hollows (E1, E2, etc.) (zones of small thickness) at the level of the positions forming the keys.

In this second embodiment, the contact zones are specific to each key of the keypad. More particularly, in this embodiment, each key of the upper face has one or more specific connections with the lower face (one example is given with the circuit C1). In other words, in this embodiment, a key is electrically connected to a plurality of contact zones (ZC1, ZC2, ZC3 for example) on the lower face. This plurality of contact zones on the lower face makes it possible, when the user places his finger on a key of the upper face, to actuate a series of contact zones (in setting up an electrical contact between the finger and the touchpad, the electrons flow through the circuit, for example C1). These series of contact zones, specific to this key, plot (activate) points on the touchpad (by transfer of electrons between the upper and the lower face) and therefore plot a geometry specific to this key on the touchpad.

For example, when three contact zones are associated with a key (three contact zones per key therefore), a pressing action by the user on one of the keys causes the formation of three simultaneous contacts on the touchpad. These three simultaneous contacts represent a unique geometrical shape (a triangle as it happens) associated with this key (character, digit) by the entry application of the terminal. Since each geometrical shape associated with each character is unique, the entry application is able to recognize the character selected by the user when he lays his finger on the key. What has just been described for three contacts is obviously valid for a greater number of contacts, the only condition being that a single geometrical shape is produced by each pressing action.

Figure 3:
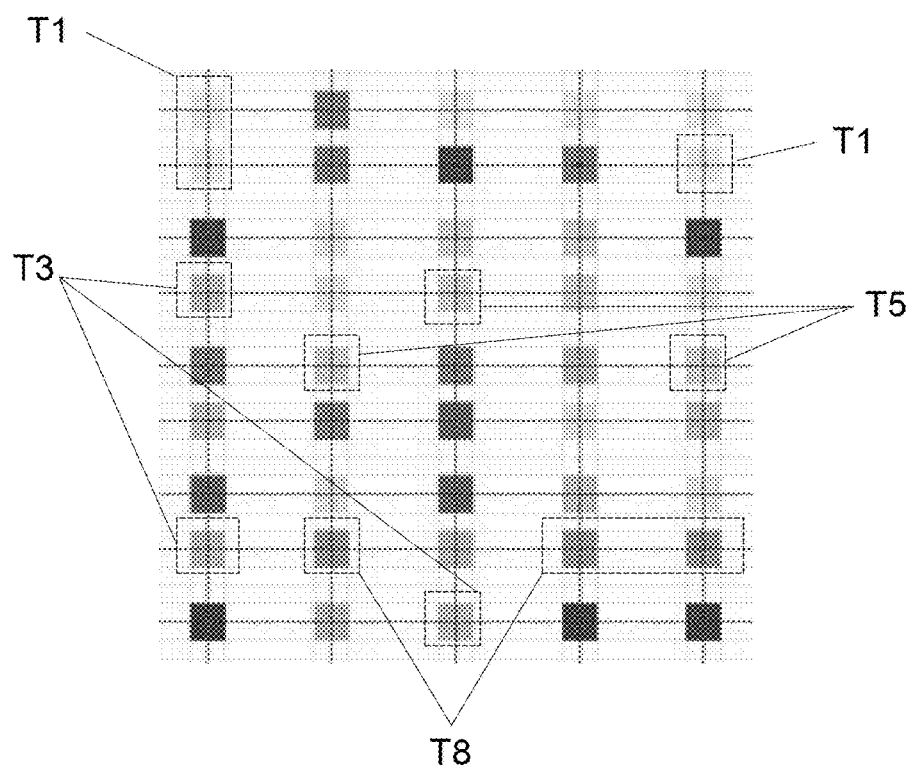
FIG. 3 illustrates a matrix of contact zones according to an exemplary embodiment of the invention.

FIG. 3 explains an architecture of contact zones presenting a unique configuration of contact zones associated with a character of a numeric data entry keypad of the PIN code type for bank card payment. Some zones have been grouped together by way of an illustration for the requirements of the description of this figure: T1, T3, T5, T8.

As can be seen in this example of FIG. 3, each group of zones produces a different shape (triangle or straight line segment) that can be interpreted by an entry application of the terminal as a particular character of the keypad.

This embodiment (and its many variants) has the advantage of providing the user with only entry surfaces on the upper face and having (conductive) contact zones on the concealed lower face. The electrical link between the keys of the upper face and the contact zones of the lower face can be implemented in several different ways. In general, the device takes the form of a plate made of transparent plastic (with a thickness of 1 to 1.5 millimeters for greater stiffness). This is for example a molded plate having zones of smaller thickness, enabling the finger to be located and the touchpad to be approached. The upper surface is for example conductive and connected to the lower surface to enable locating as described here above.

Another embodiment consists of the use of a glass plate, for example several stacked glass layers comprising different thicknesses to define the locations of the keys coupled with the use of one or more PET (polyethylene terephthalate) type films. They comprise zones of higher or lower conductivity to enable electrical conductivity between the upper face and the lower face.

In a first embodiment, the electrical conduction between the keys of the upper face and the contact zones of the lower face are made by using a vertical electrical circuit passing through the plate, from the key towards the lower face. The circuits can be made by injection or by molding when the plate is being manufactured. The plate itself can take the form of an assembling of individual plates (an upper plate, a central plate, and lower plate), of which at least one plate, for example the central plate, comprises transparent printed circuits (for example based on transparent conductive ink) making it possible to set up an electrical contact between the upper plate and the lower plate for example. Other techniques based on via holes (micro-vias) can also be implemented. Whatever the technique used, a connection is created between the location of the key on the upper face of the entry device and a plurality of contact zones of the lower face.

Figure 4:
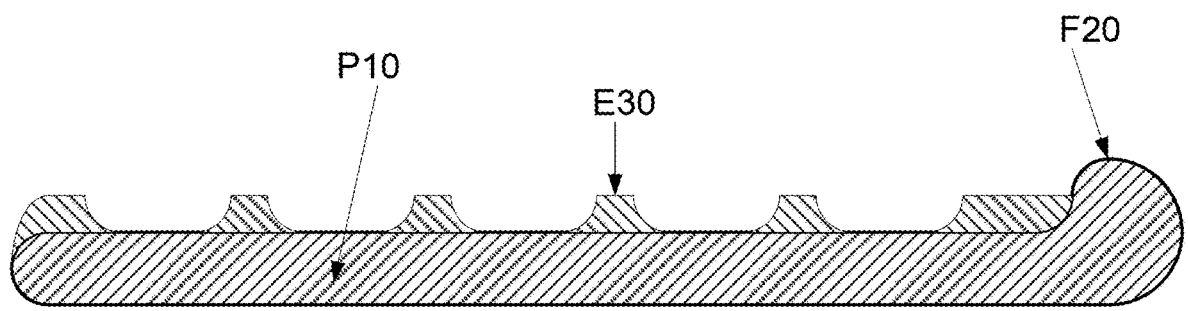
FIG. 4 illustrates an embodiment of the electrical link between the lower surface and the upper surface.

In a second embodiment presented with reference to FIG. 4 (in a sectional view), the device comprises a plate P10 made of transparent material (glass, plastic) at least partially enveloped in an ITO (indium tin oxide) film F20. The ITO film comprises traces of circuits enabling a key of the keypad on the upper face to be associated with a plurality of contact zones on the lower face (for example three contact zones). In other words, the ITO film comprises transparent printed circuits used to make contact between the user's finger and the touch-sensitive surface of the screen to enable the transportation of charges. This ITO film is coated with a PET film so that this ITO film is not harmed by successive use.

The keys are demarcated by teeth (E30).

6.3.2. Method of Data Entry

Here below, we describe a method for entering data into a touchpad of a terminal by using the device for entering data for visually impaired persons according to the first embodiment. The method comprises:

a step for the laying down, on a touch-sensitive screen of the terminal, of a device for entering data for visually impaired persons;

The device can be placed on a random zone of the touch-sensitive screen.

a step of entry, by a user, of data on the surface of the device for entering data;

The step of entry comprises a step for pressing a zone of the device for entering data at the location of a key.

a step for detecting a pattern actuated on the touch-sensitive screen of the terminal.

Unlike the procedure according to the first embodiment, this procedure according to the second embodiment no longer requires the detection of the position of the entry device. Indeed, when the user presses a key on the upper face, a unique pattern is actuated on the lower face. The terminal can determine the character or the action that the visually impaired person wishes to enter. With this mode of data entry, it can even be envisaged that the information will be entered character by character only. In this case, after each entry of a character, the visually impaired person will take up the device again, holding it in both hands, in order to locate the next character, then putting it down on the touchpad once the character is identified. He will then continue this process until he gets to the last character to be entered. Since the geometrical pattern associated with each character is unique, it is of little important that the entry device is not positioned at the same place on the touchpad between two entries of a character. The application will be capable all the same of recognizing this character. Thus, the entry device of an exemplary embodiment of the invention can be used in a versatile manner. What has just been explained is also true for the device of the embodiment although this can require a phase of detection of the laying down of the device.

Although the present disclosure has been described with reference to one or more examples, workers skilled in the art will recognize that changes may be made in form and detail without departing from the scope of the disclosure and/or the appended claims.

The invention claimed is:

1. A method for entering data on a touchpad of a terminal, the method for entering comprising:
    laying down, on a touch-sensitive screen of said terminal, a device for entering data comprising:
        an appreciably parallelepiped-shaped plate, said appreciably parallelepiped-shaped plate comprising:
            an upper face, at least one part of which comprises a keypad-forming matrix of entry zones;
            at least one electrically charged contact zone, called a detection zone, connected to a conductive element, which is located at least in part on the periphery of the upper face of said device; and
            a lower face, said lower face comprising, for each key of said keypad on the upper face, at least three contact zones electrically connected to a corresponding key of said keypad on the upper face, said at least three contact zones forming, on the lower face, a unique geometrical shape specifically associated with said key;
    detecting, by the terminal, the laying down of said device for entering data; and
    entering, by a user, data on the upper face of said device for entering data.

2. The method for entering data according to claim 1, further comprising, subsequently to the detecting, the terminal switching over into a mode of entry suited to said device for entering data.

3. A system for entering data, the system comprising:
    a terminal provided with a touch-sensitive screen; and
    a device for entering data configured to be laid down on the touch-sensitive screen of the terminal, the device comprising:
    an appreciably parallelepiped-shaped plate, said appreciably parallelepiped-shaped plate comprising:
        an upper face, at least one part of which comprises a keypad-forming matrix of entry zones;
        at least one electrically charged contact zone, called a detection zone, connected to a conductive element, which is located at least in part on the periphery of the upper face of said device; and
        a lower face, said lower face comprising, for each key of said keypad on the upper face, at least three contact zones electrically connected to a corresponding key of said keypad on the upper face, said at least three contact zones forming, on the lower face, a unique geometrical shape specifically associated with said key.

4. A device for entering data to be laid down on a touchpad of a terminal, the device for entering data comprising:
    an appreciably parallelepiped-shaped plate, said appreciably parallelepiped-shaped plate comprising:
        an upper face, at least one part of which comprises a keypad-forming matrix of entry zones, each entry zone forming a key of the keypad;
        at least one electrically charged contact zone, called a detection zone, connected to a conductive element, which is located at least in part on a periphery of the upper face of said device; and
        a lower face, said lower face comprising, for each key of said keypad on the upper face, at least three contact zones electrically connected to a corresponding key of said keypad on the upper face, said at least three contact zones forming, on the lower face, a unique geometrical shape specifically associated with said key.

5. The device according to claim 4, wherein the device is constituted by transparent plastic.

6. The device according to claim 4, wherein the appreciably parallelepiped-shaped plate has a thickness ranging from one to three millimeters, within which, zones of lesser thickness are made at the position of the keys of said keypad.

7. The device according to claim 4, wherein an electrical link between a key of the upper surface and a contact zone of the lower surface is provided by a conductive ink.

8. The device according to claim 4, wherein the keypad is a keypad for entering a confidential code on a payment terminal.

* * * * *